(12) United States Patent
Rossi et al.

(10) Patent No.: US 6,222,282 B1
(45) Date of Patent: Apr. 24, 2001

(54) WHEELCHAIR USING ONE OR MORE DC TO DC CONVERTERS TO POWER ACCESSORIES

(75) Inventors: Robert Rossi, Lockport; Dennis Beechy, Orland Hills, both of IL (US)

(73) Assignee: Advanced Peripheral Technologies, Ltd., Lockport, IL (US)

( * ) Notice: Subject to any disclaimer, the term of this patent is extended or adjusted under 35 U.S.C. 154(b) by 0 days.

(21) Appl. No.: 09/044,514

(22) Filed: Mar. 19, 1998

(51) Int. Cl.[7] .................................................. B60L 1/00
(52) U.S. Cl. .................... 307/9.1; 280/250.1; 280/304.1; 297/DIG. 4; 323/282
(58) Field of Search ..................................... 307/9.1, 10.1, 307/18, 29, 43, 48, 49, 69, 72, 75, 77, 82, 151; 363/13, 39, 59, 60, 123; 180/65.1, 65.8; 280/250.1, 210, 304.1; 297/DIG. 4; 361/93; 320/140; 323/282

(56) References Cited

U.S. PATENT DOCUMENTS

| 4,533,986 | 8/1985 | Jones . |
| 5,245,558 | 9/1993 | Hachey . |
| 5,691,629 | 11/1997 | Belnap . |
| 5,726,849 | * 3/1998 | Nakamura ............................. 361/93 |
| 5,793,189 | * 8/1998 | Kawaguchi et al. ................ 320/140 |

OTHER PUBLICATIONS

Wolfgang & Hutchinson, Eds. "Power Supplies" *The ARRL Handbood for Radio–Amateurs* pp. 6–25 to 6–35, 68th Ed. 1991.

* cited by examiner

*Primary Examiner*—Albert W. Paladini
(74) *Attorney, Agent, or Firm*—IP Focus Law Group, Ltd.

(57) ABSTRACT

A personal mobility vehicle having an accessory power system includes a drive wheel, an electric motor coupled to the drive wheel, a main power source connected to the motor, and an accessory power source energized by the main power source. The accessory power source provides an accessory output at a voltage that is independent of fluctuations in the voltage supplied by the main power source.

17 Claims, 4 Drawing Sheets

WHEELCHAIR USING ONE OR MORE DC TO DC CONVERTERS TO POWER ACCESSORIES

FIELD OF THE INVENTION

This invention relates to a personal mobility vehicle such as a wheelchair having a battery powered drive motor. This invention more specifically relates to a personal mobility vehicle having an accessory power system.

BACKGROUND OF THE INVENTION

Personal mobility vehicles (PMVs) such as electric wheelchairs are commonplace but nonetheless invaluable technology for people unable to walk independently. While available configurations vary widely, the electrical system of PMVs can be generally divided into three categories: a drive system (electric motors), a drive control unit, and a power source (batteries).

The drive system includes one or more electric motors. Two motors are often used to provide automated steering. Control units and their user interface vary in sophistication according to the needs of the PMV user, but all serve, in some fashion, to control electric power to the driving unit. For example, PMVs for users with sufficient hand control can employ a joystick drive interface, while PMVs for users without hand control may instead employ a head and mouth actuated system. The commercial standard power source for PMVs is two rechargeable, twelve volt batteries connected in series to create DC electric power at twenty-four volts.

The guiding objective for such assistive technology is to provide independence. To that end, recharging systems have been developed that allow wheelchair users to recharge wheelchair batteries without assistance from others. Also to that end, wheelchair users have come to rely on an ever growing number of other assistive devices now available. Common examples include speech synthesizers and remote environmental controllers. Many such devices work with or through computers adapted for attachment to the wheelchair. Furthermore, wheelchair users, no less than others, enjoy the use of consumer electronic devices such as cellular phones and portable radios, tape and CD players.

To be portable with the wheelchair, these accessory devices must also be powered by batteries. Unfortunately, the required battery type and shape varies according to the electronic device. While rechargeable batteries may be available, they must be separately recharged using an appropriate AC driven power supply. For many wheelchair users, this accessory battery recharging or swapping limits their independence because it requires assistance from others.

What is needed is a PMV that can safely and reliably power the electronic accessories as well as the drive system from the same main power source. Accordingly, the present invention provides a PMV having an accessory power source that draws electric power from the main PMV batteries and delivers stable DC electric power at a given accessory voltage.

SUMMARY OF THE INVENTION

Personal mobility vehicles of the present invention provide electric power to both the drive system and various electric accessories from a common source. Notably, the system of the present invention minimizes disruption in power to the accessories from the characteristic voltage fluctuations at the power source that are caused by activation and use of drive motors.

PMVs according to the present invention include a drive wheel, an electric motor operably coupled to the drive wheel, a main power source operably connected to the motor for supplying power to the motor, a control unit connected between the main power source and the motor for controlling the motor, and an accessory power source adapted to be energized by the main power source. The accessory power source provides at least one accessory power output at an accessory voltage which is independent of fluctuations in the power supplied to the motor.

In a preferred embodiment, the accessory power source includes an input connector for receiving power at a first voltage that fluctuates in response to PMV drive commands, and a DC-DC switching-mode regulator operably connected to the input connector that provides DC electric power at a stable, relatively lower second voltage which is independent of variations in the first voltage. To provide multiple, independently regulated accessory power outputs the power source may include an array of DC-DC converters each operably coupled to the input connector. To support a wide range of different types of electric accessories, the power source may employ at least one DC-DC converter having an adjustable output voltage.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

Figure 1:
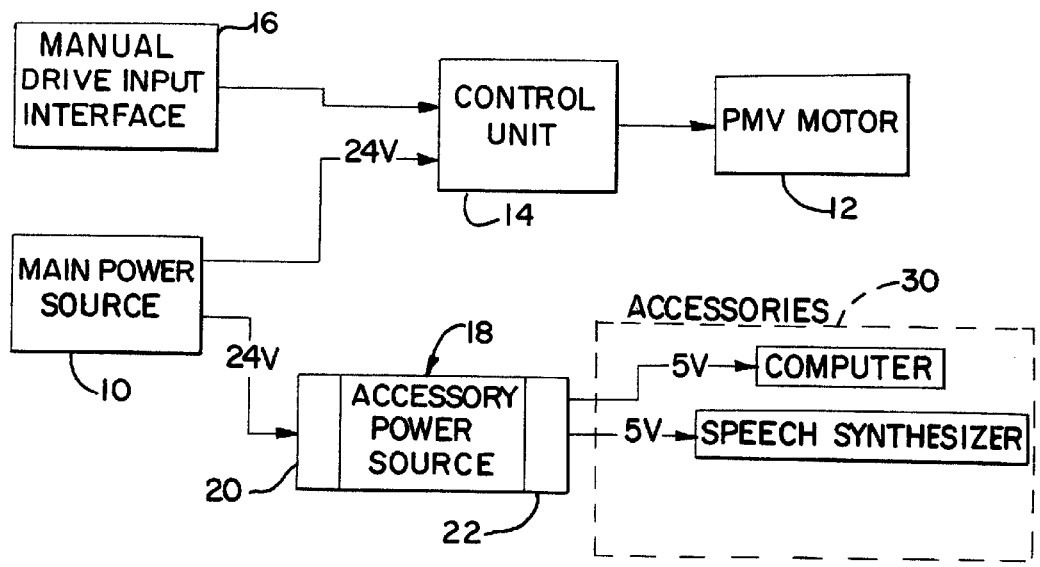
FIG. 1 is a simplified block diagram showing the interconnection of electric components of a personal mobility vehicle according to the present invention.

The invention disclosed herein is, of course, susceptible of embodiment in may different forms. Shown in the drawings and described hereinbelow in detail are preferred embodiments of the invention. It is to be understood, however, that the present disclosure is an exemplification of the principles of the invention and do not limit the invention to the illustrated embodiments.

As used herein, the phrase "personal mobility vehicle" or "PMV" means vehicles designed to provide both indoor and outdoor mobility to people who are unable, or have difficulty, walking independently. PMVs include electromotive wheelchairs, carts and the like, but generally do not include vehicles specifically designed for use on roadways such as automobiles and motorcycles. As electric wheelchairs are a well recognized type of PMV, electric wheelchair and PMV are used interchangeably for the present discussion.

Embodiments of the contemplated device illustrated in the FIGURES show details of electronic circuit elements that are known in the art and that will be recognized by those skilled in the art as such. The detailed descriptions of such elements are not necessary to an understanding of the invention. Accordingly, such elements are herein represented only to the degree necessary to aid an understanding of the features of the present invention.

In the FIGURES, a single block or cell may indicate several individual components and/or circuits that collectively perform a single function. Likewise, a single line may represent several individual signals or energy transmission paths for performing a particular operation.

Turning to FIG. 1, the electric elements of a personal mobility vehicle are shown with a main power source 10 for energizing an electric motor 12 and an accessory power source 18. Electric motor 12 is controlled by a control unit 14 that is connected between electric motor 12 and the main power source 12. A manual drive input interface 16 (such as a joystick) is operably connected to the control unit, allowing the PMV user to give drive commands to motor 12.

Accessory power source 18 has an input connector 20 and one or more output connectors, indicated by reference numeral 22. As shown in FIG. 1, accessory power source 18 provides accessory power output at a relatively lower accessory voltage to various electric or electronic accessories 30.

In FIG. 1, the output voltage indication of "24V" for main power source 10 reflects the industry standard drive-system input-voltage for most commercially available PMVs. And while individual 24-volt wheelchair batteries are available, the more common approach calls for two 12-volt batteries wired in series. Notwithstanding these industry conventions, PMVs according to the present invention are not limited to specific voltage standards or battery types. For example, a PMV according to this invention could employ a nominal 48-volt main power source and drive system.

Activation and use of electric motor 12 by drive commands from interface 16 results in fluctuations in the voltage supplied by main power source 10. Accessory power source 18 is energized with this fluctuating voltage, but nonetheless provides accessory power outputs at a substantially stable voltage, thereby protecting electronic accessories from damage or service disruption. As used herein, the phrase "substantially stable voltage" means that the static voltage tolerance does not exceed about ±2 percent of the average output voltage.

Figure 2:
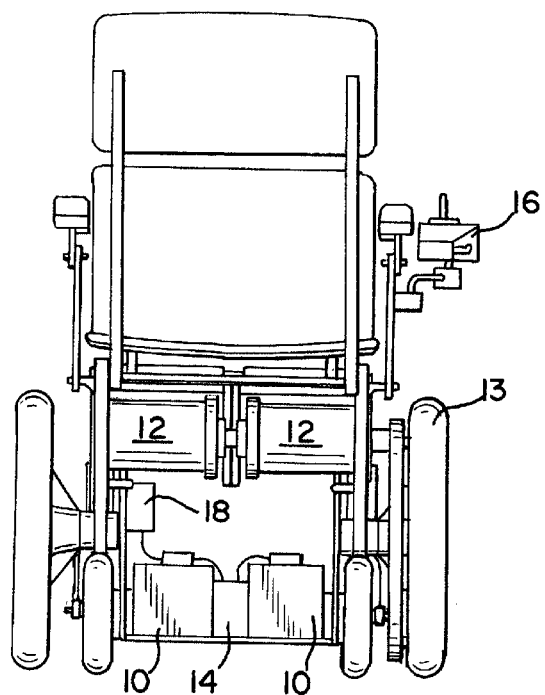
FIG. 2 a rear elevation view of a personal mobility vehicle according to the present invention.

FIG. 2 demonstrates a suitable mounting position for the accessory power source 18 among other components of an electric wheel chair. FIG. 2 also illustrates the operable coupling between electric motor 12 and a drive wheel 13. The specific mounting position is not critical and may of course vary according to PMV type and configuration, the PMV user's preference, or the placement and configuration of a given electric accessory.

Figure 3:
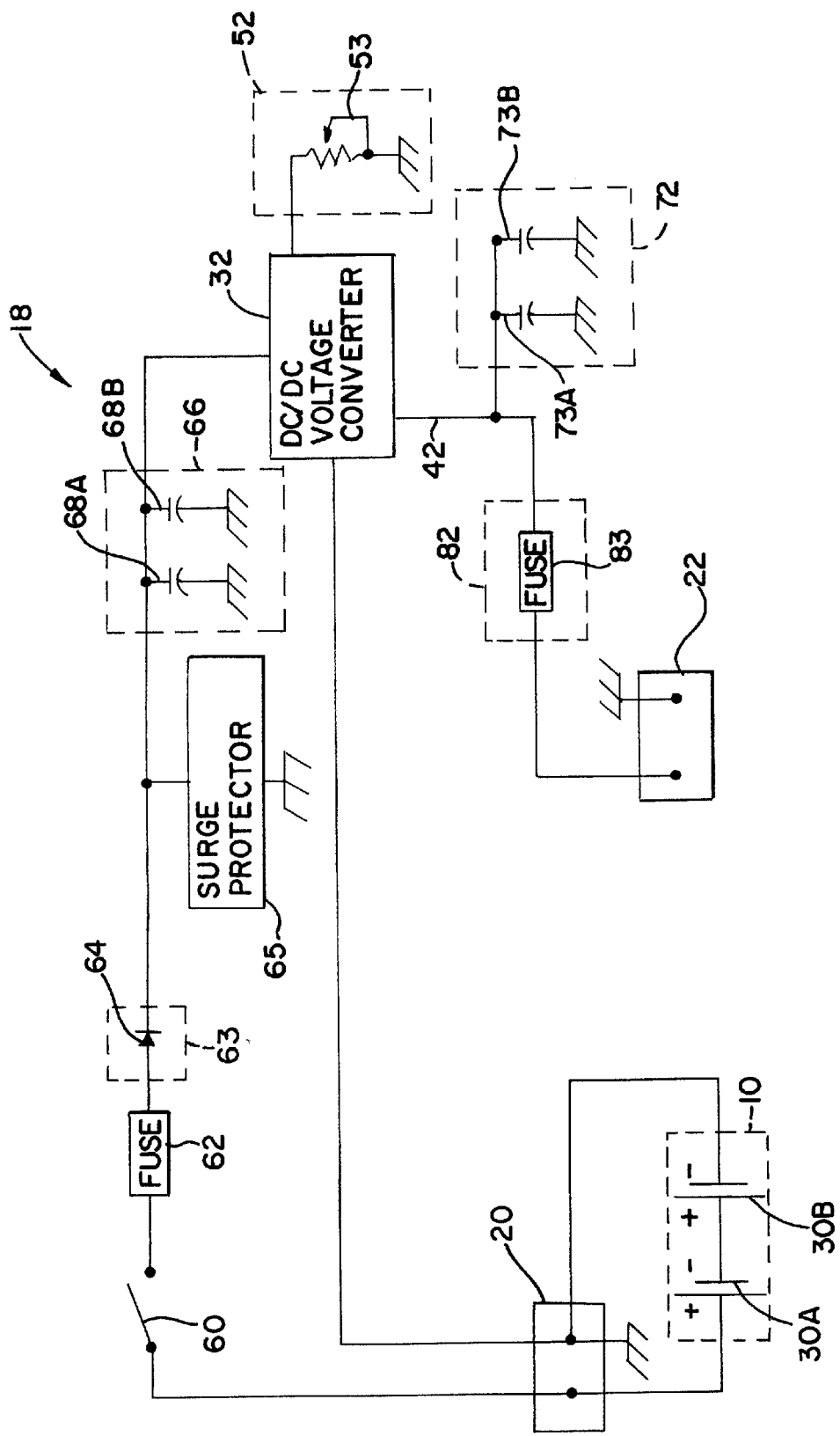
FIG. 3 is a simplified circuit schematic of a PMV accessory power source according to the present invention.

A simplified circuit schematic for a PMV accessory power source embodying the present invention is presented in FIG. 3. As shown, input connector 20 is adapted to receive power at a first or main voltage from main power source 10, which is preferably a series of two conventional batteries 30A and 30B. A regulated direct-current to direct-current (DC-DC) voltage converter 32 receives power from the main power source 10 at the first voltage through a connection to input connector 20.

Regulated converter 32 reduces and regulates the first voltage to produce an accessory power output 42 at a stable, relatively lower second voltage which is independent of variations in the first voltage. Various types of regulated DC-DC voltage converters are appropriate for use in the present invention, including both linear and switching-mode voltage regulators. See for instance, *Electronics Engineers' Handbook,* 3rd Ed., Fink D. G. and Christiansen D. (eds), McGraw-Hill Book Co. (1989).

For their small size, efficiency, and reduced heat generation, switching-mode regulators are preferred. Suitable switching-mode regulators include buck, boost and buck-boost mode regulators. Buck mode regulators are also known as choppers, down-converters, step-down converts, and down-choppers.

Many suitable voltage converter sub-circuits are commercially available in the form of integrated modules. For example, a particularly preferred DC-DC switching-mode regulator is available in the form of an integrated module from Power Trends Inc., Batavia, Ill., under the designation "PT6304."

Regulated DC-DC converter 32 is configured to produce accessory power output 42 with an adjustable voltage and has an output voltage manual adjuster 52 for this purpose. Manual adjuster 52 is preferably a potentiometer circuit 53 operably associated with converter 32.

For enhanced features, the connection between input connector (or terminal) 20 and converter 32 includes a series of circuit elements: an on/off switch 60, a fuse 62, a polarity guard 63 such as diode 64, a transient surge protector 65, and an input filter 66. Switch 60 allows PMV accessory power source 18 to be turned off when accessories are not in use. Polarity guard 63, preferably a diode 64, serves to protect circuit components and accessories from an inadvertent or reverse input connection to a main power source.

Transient surge protector 65 substantially prevents high voltage surges from disrupting or damaging power source components and associated accessories. The transient surge protector may be selected to provide overvoltage protection as well. To provide overvoltage protection, transient surge protectors can be configured to short to ground (or chassis ground), if an overvoltage input is sustained for a selected period.

Transient surge protectors are known and commercially available. Various components may serve in this role. Examples include metal oxide varistors, zener diodes, and thyrectors.

Input filter 66, which is preferably two capacitance filters 68A and 68B in series, conditions power supplied to converter 32.

The accessory power output side of converter 32 also includes some enhancing circuit elements. An output filter 72 (also preferably a set of capacitance filters, 73A and 73B, further stabilizes the accessory output 42. In addition, an over-current protector 82 protects accessories from excessive input currents. Over-current protector 82 is preferably a fuse 83, but could be switching circuit-breaker or the like. Output connector 22 serves as the point of connection for accessories.

Figure 4:
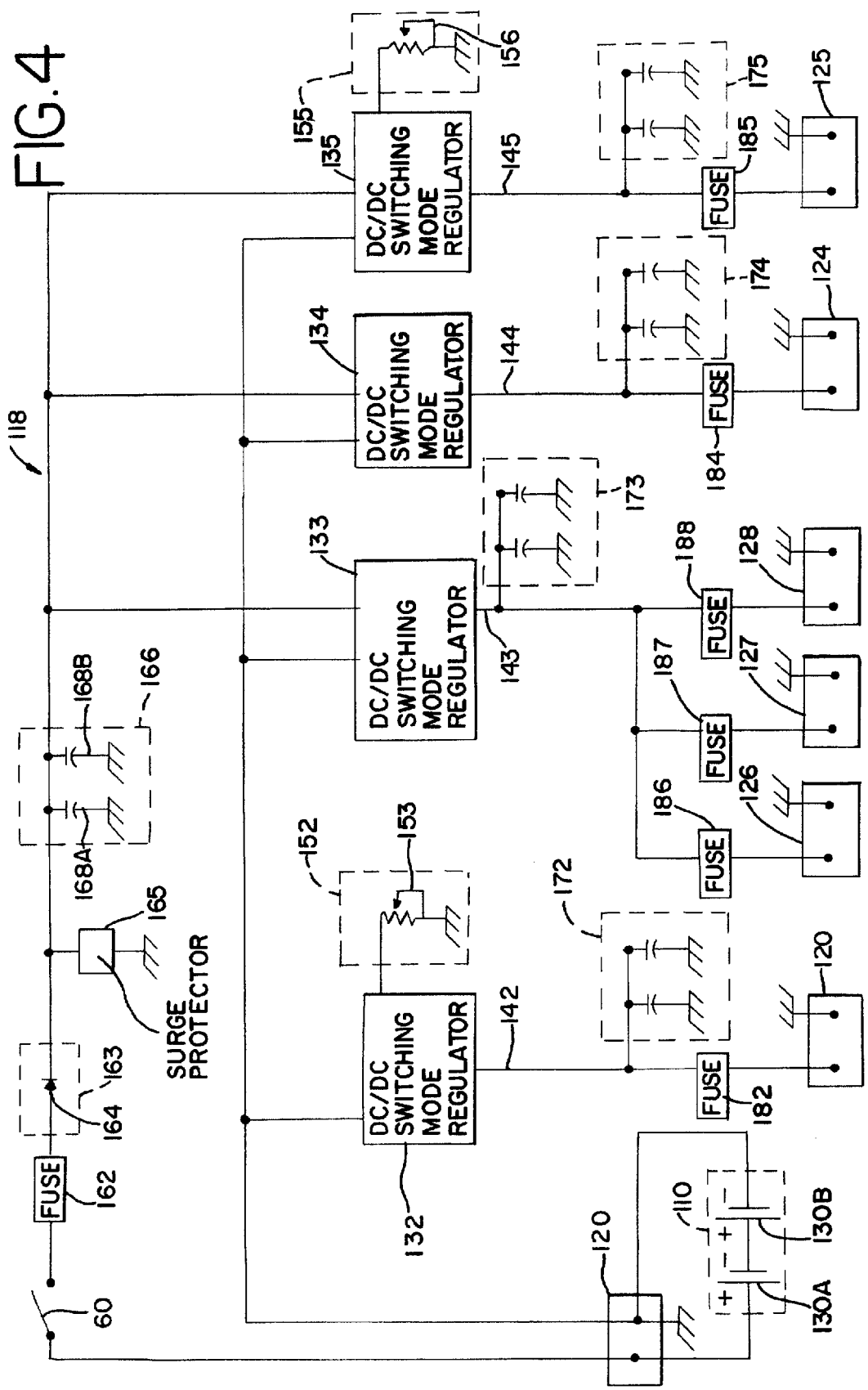
FIG. 4 is a simplified circuit schematic of an alternate embodiment of a PMV power source according to the present invention.
Figure 5:
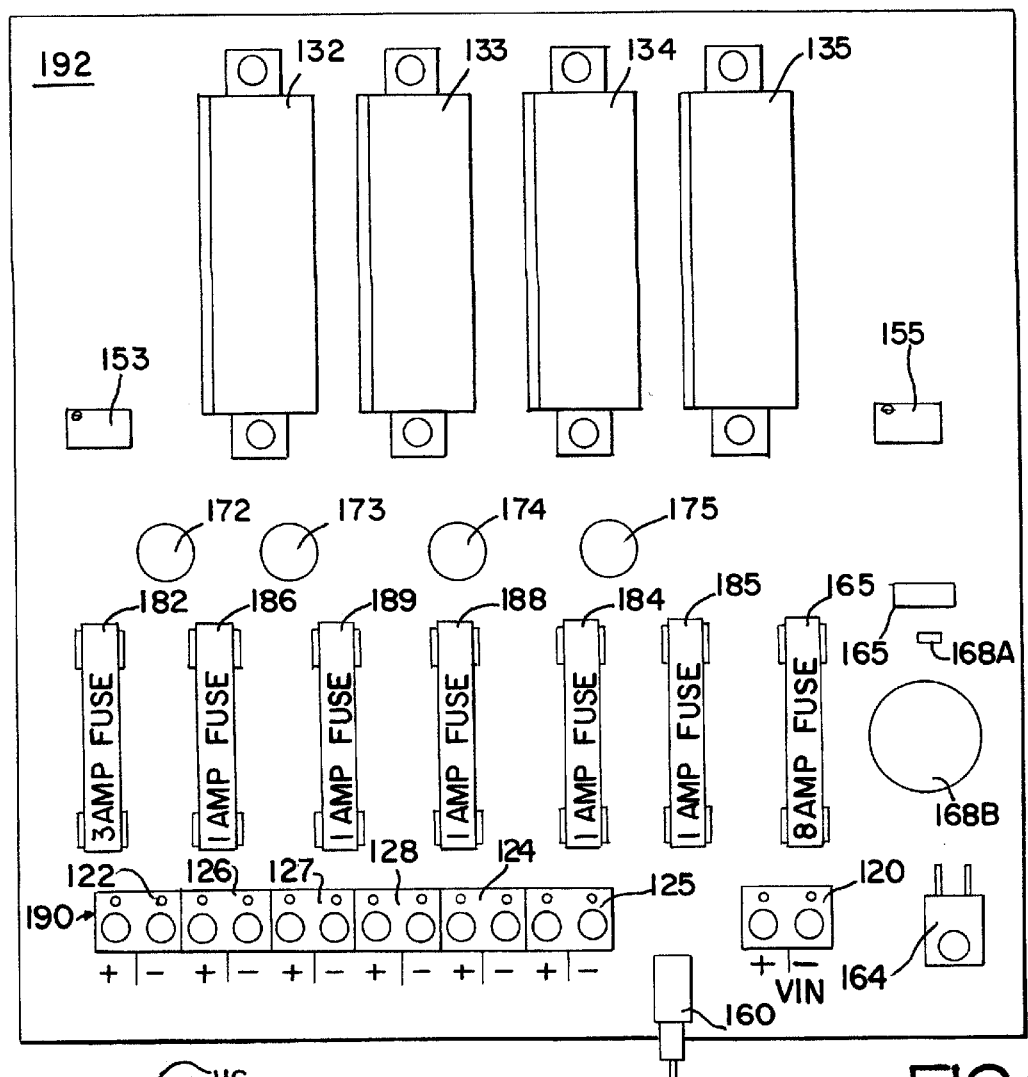
FIG. 5 is a simplified plan view showing a circuit board layout for the PMV accessory power source of FIG. 4.
Figure 6:
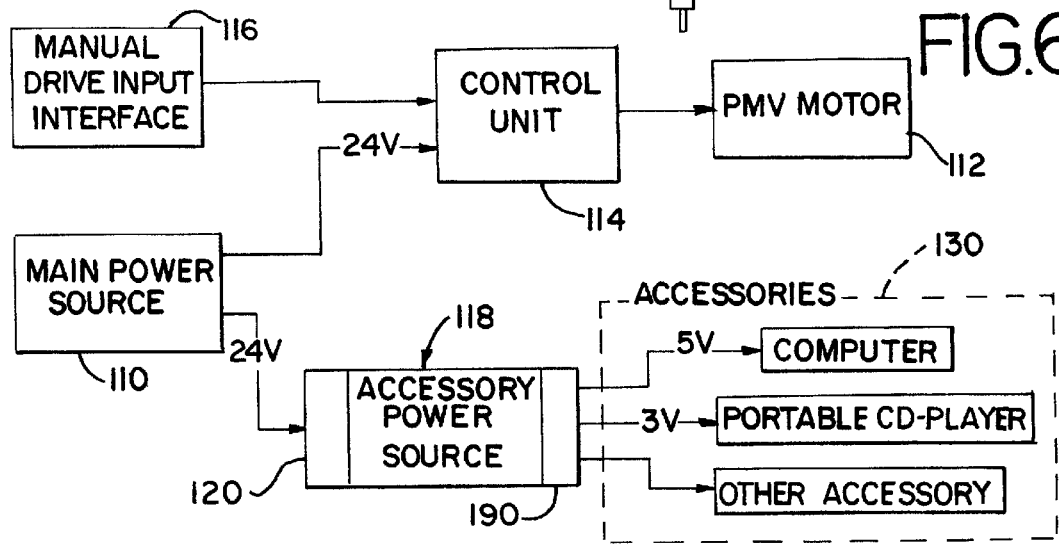
FIG. 6 is a simplified block diagram showing the interconnection of electric components of a personal mobility vehicle according to the present invention.

The PMV accessory power source illustrated in FIG. 3 represents one of many possible configurations captured by the present invention. FIGS. 4 through 6 depict one such other configuration, denoted accessory power source 118. Elements illustrated in FIGS. 4 through 6 perform a similar function to elements previously shown in FIGS. 1 through 3 and generally have been assigned the same last two digits in their reference numerals as those in FIGS. 1 through 3.

Referring to FIG. 4, accessory power source 118 includes a parallel array of four DC-DC switching-mode regulators 132–135 connected to a main power source 110 through an input connecter 120. Here, the array of switching mode regulators each has a corresponding array of accessory outputs 142–145 for providing power to accessories at preselected accessory voltages. Each voltage regulator (132–135) provides an accessory output (142–145) for powering accessories at a voltage that is not only relatively lower than the voltage of the main DC power source, but also substantially stable during changes in the main DC power source caused by activation and use of the PMV drive system or other power load fluctuation.

While switching-mode regulators 133 and 134 each produce a fixed accessory output voltage, regulators 132 and 135 have user selectable output voltages as indicated by the corresponding manual adjusters (or selectors) 152 and 155, respectively. These manual adjusters 152 and 155 are preferably potentiometers 153 and 156, respectively. The potentiometers 153 and 156 are connected to the regulators 132 and 135, respectively, and serve to generate a reference voltage that is a function of the desired accessory output voltage.

An on/off switch 160, a fuse 162, a polarity guard 163, a transient surge protector 165, and an input filter 166 serve functions as described above for FIG. 3. Polarity guard 163 is preferably a diode 164. A high and low pass capacitance filter 168A and 168B (respectively) are preferred for input filter 166. Other known filter elements may be substituted, however.

Accessory power outputs 142–145 are further conditioned by corresponding output filters 172–175. Here again, capacitance filters are preferred but in no way critical to practicing the present invention. Output fuses 182–188 protect both electronic accessories and accessory power source 118 from short circuits and excessive current levels, while output connectors 122–128 represent the connection point for electric accessories.

Accessory power output 143 of converter 133 is divided into three separate outputs, each having individual output connectors 126–128 and fuses 186–188, respectively. This configuration allows multiple accessories having the same voltage requirement to draw power through a single converter, when desired.

PMV accessory power sources embodying the present invention can be built by mounting circuit elements on a printed circuit board. FIG. 5 is a plan view of a typical circuit board 192 that shows the arrangement of selected circuit elements of FIG. 4. For example, the six output connectors 122–128 shown schematically in FIG. 4 may be physically combined to a single terminal header 190, as shown in FIG. 5.

In FIG. 6, the electric elements of a personal mobility vehicle are shown accessory power source 118. Here, a main power source 110 energizes an electric motor 112 and accessory power source 118. Electric motor 112 is controlled by a control unit 114 that is connected between electric motor 112 and main power source 112. A manual drive input interface 116 (such as a joystick) is operably connected to the control unit, allowing the PMV user to give drive commands to motor 112.

Accessory power source 118 includes input connector 120 and one or more output connectors, indicated by reference numeral 190. As shown in FIG. 6, accessory power source 118 provides accessory power outputs at relatively lower accessory voltages to various electric or electronic accessories 130.

While specific component specifications are generally not critical, the operating parameters for the components of the accessory power source illustrated in FIGS. 4 and 5 are preferably selected to be compatible with wide variety of electronic accessories and the industry-standard PMV main power source.

According to this preference, main power source 110 includes two 12-volt batteries 130A and 130B connected in series. Transient surge protector 165 is selected to clip transients above about 30 volts. Converters 132 and 133 are switching regulators that operate at about 93 percent efficiency. Each of these two converters has an input limits of about 3 amperes maximum current and a voltage range of about 14.5 to about 30 volts. Converter 132 provides accessory output 142 of up to about 3 amperes that is user selectable over a voltage range of about 12 to about 22 volts, while convert 133 provides an accessory output 143 of up to about 3 amperes at about 12 volts, fixed.

Also according to this preference, converters 134 and 135 are preferably switching regulators. Converters 134 and 135 operate at about 90 percent efficiency, and each has input limits of about 1 ampere maximum current and a voltage range of about 7 to about 30 volts. Converter 35 provides accessory output 145 at a voltage that is user selectable over the range of about 5 to about 11 volts and at a current up to about 1 ampere. Converter 134 provides accessory output 144 at a fixed 5 volts and a current up to about 1 ampere.

The current rating of the various short-circuit (or overcurrent) protectors is selected according to the current rating of the converters 132–135. For example, the current rating for fuse 183 is 3 amperes, while the rating for fuse 185 is 1 ampere. Input fuse 165 is preferably selected with a current rating corresponding to the combined maximum current rating for converters 132–135, which is for this configuration about 8 amperes. The ratings of fuses 186 through 188 may be selected according to the limits of the accessories connected at output connectors 126–128, respectively.

Devices constructed embodying the present invention have a number of beneficial features. For example, accessory power sources prepared according to the present invention can provide stable conditioned DC power to accessories from the same main batteries used to power the drive system. The power supplied to the accessories is not interrupted (or destabilized) by use of the high-draw electric motors that necessarily cause fluctuations in the voltage delivered by the PMV main batteries of the drive system. Therefore, PMVs of this invention can accommodate power sensitive devices such as portable computers.

Furthermore, PMVs of this invention can provide power to multiple accessories at a variety of voltage ratings. Taken together, these features contribute to the independence of the PMV user.

Yet another feature relates to battery usage. PMV batteries that become too drained to effectively power the electric motors of the drive system remain effective to energize lower power accessories.

Also notable, accessory power sources embodying the present invention are relatively compact and can be conveniently packaged in small housing. For example, a four-converter multi-output accessory power source can be conveniently housed in a box no larger than about 500 cubic centimeters. A single-output power source according to the present invention can be configured to occupy no more than about 100 cubic centimeters.

The foregoing specification and drawings are to be taken as illustrative but not limiting of the present invention. Still other configurations and embodiments utilizing the spirit and scope of the present invention are possible, and will readily present themselves to those skilled in the art.

We claim:

1. An electromotive wheelchair comprising:
   a drive wheel;
   a electric motor operably coupled to the drive wheel;
   a main power source operably connected to the motor for supplying power to the motor;
   a control unit for controlling the motor; and
   an accessory power source adapted to be energized by the main power source for providing an accessory power output at an accessory voltage which is independent of fluctuations in the power supplied to the motor
   wherein the accessory power source includes a DC-DC switching-mode regulator operably connected to the main power source and the accessory power output has an adjustable output voltage.

2. The electromotive wheelchair vehicle of claim 1 wherein the accessory power source is a regulated DC-DC voltage converter operably connected to the main power source.

3. The electromotive wheelchair vehicle of claim 1 wherein the accessory power source provides more than one accessory power output.

4. An accessory power source for an electromotive wheelchair that comprises:
   an input connector for receiving power at a first voltage that varies in response to drive commands;
   a DC-DC switching-mode regulator operably connected to the input connector and providing DC electric power at a stable, relatively lower second voltage which is independent of fluctuations in the first voltage; and
   a filter operably connected between the input connector and the DC-DC switching-mode regulator, the filter providing a filtered DC electric power to the DC-DC switching-mode regulator at substantially the same voltage as the first voltage.

5. The accessory power source of claim 4 wherein the filter is a capacitance filter.

6. The accessory power source of claim 4 further comprising an on-off switch operably connected between the input connector and the DC-DC switching-mode regulator for controlling power to accessories.

7. The accessory power source of claim 4 further comprising a polarity guard operably connected between the input connector and the DC-DC switching-mode regulator.

8. The accessory power source of claim 4 further comprising a transient surge protector connected between the input connector and the DC-DC switching-mode regulator.

9. An accessory power system for an electromotive wheelchair and the like vehicle equipped with a main DC power source and a drive motor controllably connected to the power source, the power system comprising:
   a parallel array of DC-DC converters connected to the main power source, each converter adapted to receive DC electric power at a main voltage with variations in response to activation of the drive motor and providing a power output at a relatively lower accessory voltage, the accessory voltage supplied by each DC-DC converter being substantially stable when changes in the main voltage supplied by the main DC power source are caused by activation and use of the drive motor.

10. The accessory power system of claim 9 having two DC-DC converters.

11. The accessory power system of claim 9 wherein the DC-DC converters are switching-mode regulators.

12. The accessory power system of claim 9 wherein the array of DC-DC converters each provide a power output at a different accessory voltage.

13. The accessory power system of claim 9 wherein at least one of the DC-DC converters has a power output with an adjustable voltage.

14. The accessory power system of claim 9 wherein one of the DC-DC converters has more than one power output.

15. The accessory power system of claim 9 further comprising a parallel array of over-current protectors connected to the DC-DC converters.

16. The accessory power source for an electromotive wheelchair having a power source and a drive motor controllably connected to the power source to energize the drive motor, the power source comprising:
   a parallel array of DC-DC switching-mode regulators operably connected to the power source, each regulator having at least one output; and
   a parallel array of output filters operably connected to the outputs of the regulators;
   a polarity guard operably connected between the power source and the regulators.

17. The accessory power source of claim 16 housed in a box no larger than about 500 cubic centimeters.

* * * * *